United States Patent
Zoratti et al.

(10) Patent No.: US 6,452,534 B1
(45) Date of Patent: Sep. 17, 2002

(54) RADAR FIELD-OF-VIEW ENHANCEMENT METHOD AND APPARATUS FOR MATCHING FIELD-OF-VIEW TO DESIRED DETECTION ZONE

(75) Inventors: Paul Kirk Zoratti, South Lyon, MI (US); Jeffrey Schaefer, Chelmsford, MA (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/806,964

(22) PCT Filed: Aug. 4, 2000

(86) PCT No.: PCT/US00/21384

§ 371 (c)(1),
(2), (4) Date: Apr. 6, 2001

(87) PCT Pub. No.: WO01/11384

PCT Pub. Date: Feb. 15, 2001

(51) Int. Cl.$^7$ .............................................. G01S 13/93
(52) U.S. Cl. ..................... 342/70; 342/71; 342/72; 701/301; 340/903; 340/435; 340/436
(58) Field of Search .................... 342/70, 71, 72, 342/27, 28, 90, 93; 701/301; 340/435, 436, 901, 903

(56) References Cited

U.S. PATENT DOCUMENTS

| | | | |
|---|---|---|---|
| 4,308,536 A | * 12/1981 | Sims, Jr. et al. | 342/70 |
| 5,313,262 A | 5/1994 | Leonard | 356/5 |
| 5,448,244 A | 9/1995 | Komatsu et al. | 342/155 |
| 5,467,072 A | 11/1995 | Michael | 340/436 |
| 5,471,214 A | 11/1995 | Faibish et al. | 342/70 |
| 5,563,602 A | 10/1996 | Stove | 342/70 |
| 5,579,021 A | 11/1996 | Lee | 343/781 P |
| 5,583,511 A | 12/1996 | Hulderman | 342/175 |
| 5,612,699 A | 3/1997 | Yamada | 342/70 |
| 5,767,793 A | * 6/1998 | Agravante et al. | 340/903 |
| 5,940,011 A | * 8/1999 | Agravante et al. | 340/903 |
| 6,232,910 B1 | * 5/2002 | Bell et al. | 342/70 |

* cited by examiner

*Primary Examiner*—John B. Sotomayor
(74) *Attorney, Agent, or Firm*—Brinks Hofer Gilson & Lione

(57) ABSTRACT

A radar field-of-view enhancement method particularly adapted for vehicle radar detection systems having a specified detection zone. In accordance with the invention, a pair of discrete radar beams are employed having differing arc widths. Return signals from the discrete beams are compared and related to the area of a desired detection zone. This approach increases the reliability of detection in the detection zone while minimizing false alarms and missed detection areas. The beams are alternately switched on using discrete sources or by implementing a discrete phase shifting element interposed between the sources.

20 Claims, 5 Drawing Sheets

RADAR FIELD-OF-VIEW ENHANCEMENT METHOD AND APPARATUS FOR MATCHING FIELD-OF-VIEW TO DESIRED DETECTION ZONE

FIELD OF THE INVENTION

This invention relates to a radar detection system and particularly to such a system utilized in connection with motor vehicle detection systems.

BACKGROUND AND SUMMARY OF THE INVENTION

Radar technology has been proposed as a remote sensing solution for future automotive functions such as blind spot detection, adaptive cruise control, parking aid, and collision warning. Such functions may also find applications in connection with other vehicles, such as marine or aircraft. Radar sensor antennas typically emit electromagnetic radiation in a conical or fan-shaped pattern. This pattern defines a "field-of-view" (FOV) of the sensor. In general, objects outside the sensor's FOV have a low probability of being detected, and those within the FOV, given they reflect an adequate amount of electromagnetic energy, have a high probability of detection. The vehicle applications mentioned previously may have specified desired detection zones which are not conical or fan-shaped and therefore may not be compatible with the typical radar sensor's FOV.

The above-referenced problem is particularly significant in connection with certain automotive applications. For example, for use in blind spot detection systems, it is desirable to provide a vehicle operator with a warning of the presence of an obstacle where visual perception is difficult. For such applications, the inability of a radar detection system to properly indicate the presence of an obstacle in a blind spot is a particular concern. Similarly, other applications of radar detection systems often involve critical detection and control requirements.

Various approaches have been considered toward eliminating the previously-mentioned design concerns. One approach to tailoring the radar sensor's FOV to an irregularly-shaped detection zone is to generate a very narrow beam pattern and then electronically or mechanically scan or sweep the beam over an area of interest. This is the approach used in conventional aircraft detection radar systems in which a narrow beam is swept through an area of interest. The purpose of such rotating or scanning beam in such applications is to provide a high-energy focus beam effective for detection over long distances and further to enable precise positioning information to be obtained from the returned radar signal. Such an approach would enable scanning coupled with appropriate range gating of the return signal to allow the radar sensor FOV to closely match the desired detection zone. However, the creation of a narrow beam pattern requires a physically large antenna aperture and therefore a relatively large package size which may be undesirable in many vehicle applications. Moreover, mechanically or electronically scanned configurations tend to be expensive and can have an adverse effect on overall system reliability.

SUMMARY OF THE INVENTION

In accordance with this invention, a radar sensing system and method is provided in which a desired blind spot detection zone is encompassed by at least two radar radiation patterns having differing beam cone angle measures. This plurality of beams can be created using a single radiating antenna which is electronically controlled or by using discrete antennas having differing widths. By comparing the signals, and the signal returns from these plural radiation patterns, appropriate signal processing circuitry can be employed to reveal with a reduced probability of false alarms or missed detections the presence of an object in the detection zone.

DETAILED DESCRIPTION OF THE PRIOR ART

Figure 1:
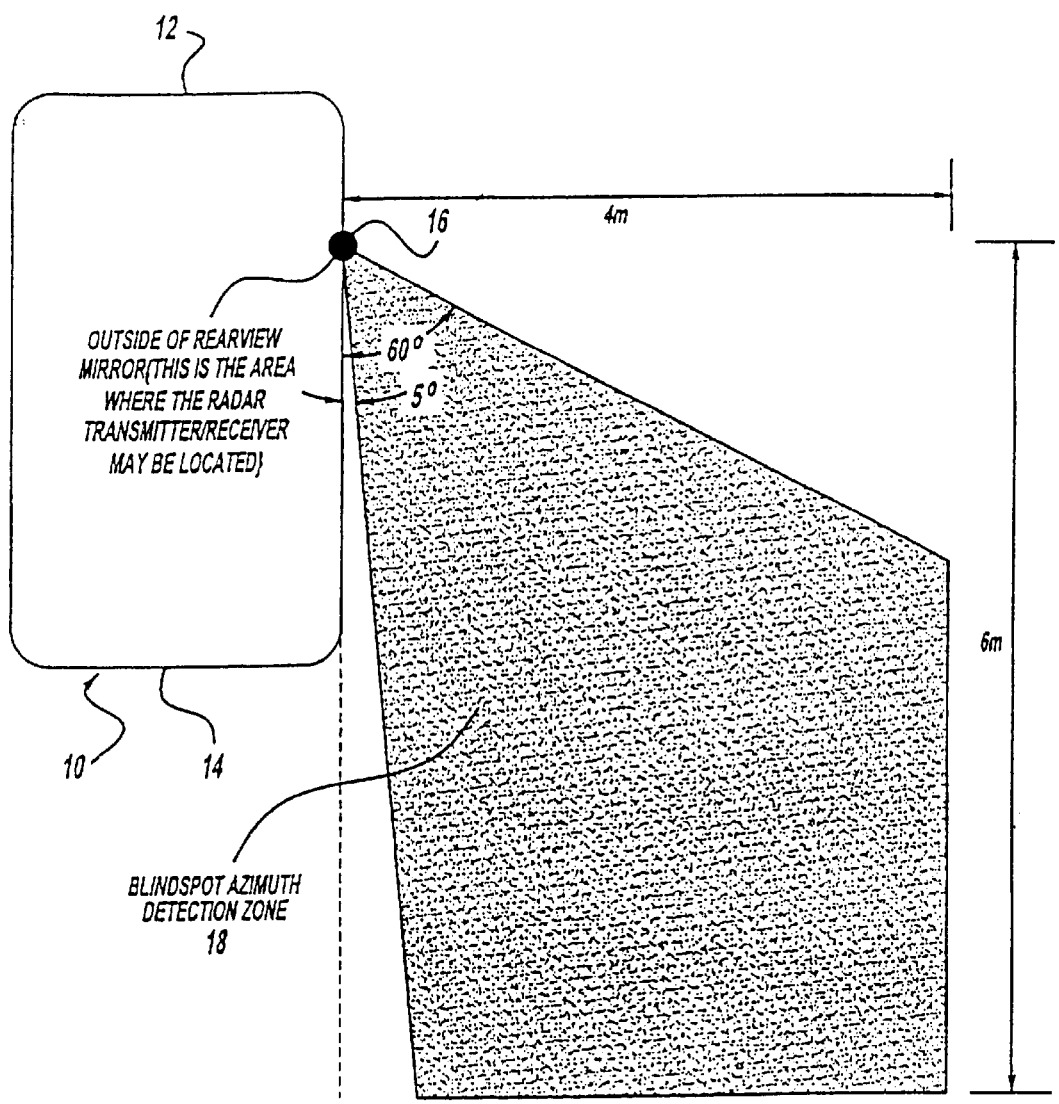
FIG. 1 is a diagramatic top view of a vehicle with the outline of a desired detection zone indicated.

Now with reference to FIG. 1, a top view looking down on a representative motor vehicle 10 is provided oriented having front end 12 and rear end 14. Vehicle 10 further includes an outside rear view mirror 14. Since outside rear view mirror 16 provides a limited field of visual view and since drivers do not constantly monitor images appearing in outside rear view mirrors, motor vehicle designers have designated a desired object detection zone designated by reference number 18. As shown, detection zone 18 has major dimensions shown as being approximately 4 meters wide and 6 meters deep when measured rearwardly from outside rear view mirror 16. Detection zone 18 is especially adapted toward an area where vehicles in other lanes may be present. Detection zone 18 represents an area in which it is desired to generate a control or detection signal which may be utilized by the motor vehicle operator or other control systems associated with the vehicle 10. Detection zone 18 shown in FIG. 1 is representative of a particular motor vehicle application. It must be recognized that various automobile manufacturers as well as specific models may produce detection zones 18 having dimensions varying from those shown herein. Similarly, other applications of the systems in accordance with this invention may have other obstacle detection requirements and therefore differing configurations for their associated detection zones.

The detection zone 18 shown in FIG. 1 is also shown in the remaining figures of this specification.

Figure 2:
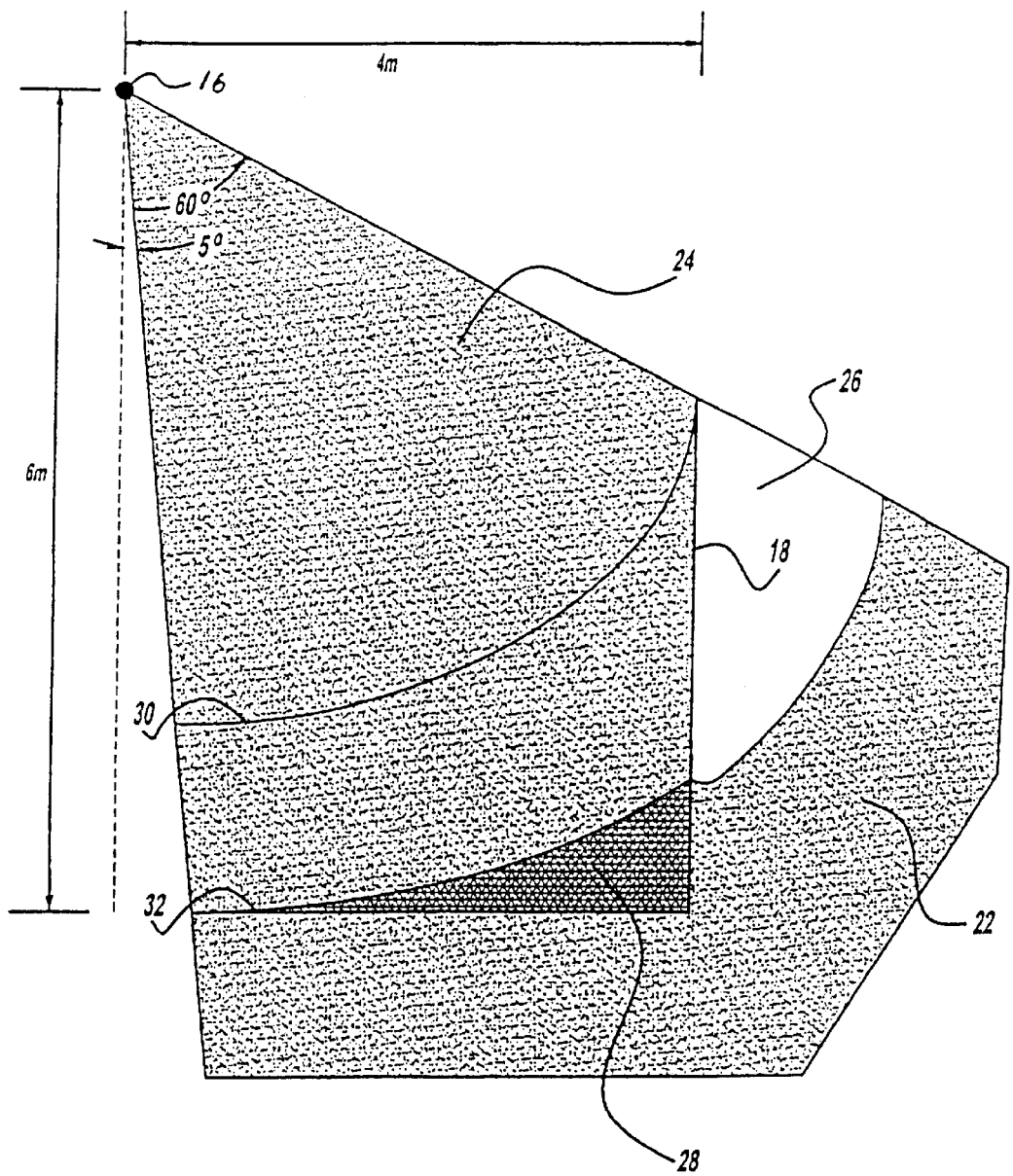
FIG. 2 is a view similar to FIG. 1 designating areas of the desired detection zone superimposed with areas designating the sensitivity of a single beam radar detection system in accordance with the prior art.

Now with reference to FIG. 2, a prior art system is described as related to detection zone 18. FIG. 2 designates an area which encompasses but extends beyond detection zone 18 which designates a radar detection pattern 22. This radar detection pattern 22 is in turn divided into three distinct areas. Areas designated by light crosshatching defines a positive detection area 24. Objects located within positive detection area 24 would produce a return signal. Radar detection pattern 22 further defines false alarm area 26 which is an area which produces a return signal for the radar detection system but is outside the desired detection zone 18. Therefore, objects present in false alarm area 26 produce a signal indicating that an object is present but the signal is termed a false alarm because there is no desire to detect objects in that area and in fact, it is desired to ignore these objects. Missed detection area 28 designated by dark crosshatching designates an area outside a particular range of the radar signal emanating from rear view mirror 16 but within detection zone 18.

Radar systems of the type used in connection with vehicle 10 can be tuned to accurately detect the distance of objects from mirror 16. A pair of ranges designated by arcs 30 and 32 are provided in FIG. 2. Arc 30 designates a representative arc having a radius of 4 meters from mirror 16 where as arc 32 designates a range of six meters from mirror 16. As is evident from FIG. 2, any object above a certain critical design size present within detection zone 18 and within arc 30 are positively and unambiguously detected. However, the inherent shape of the radar return patterns being based on a series of arcs emanating from the source do not precisely match the polygonal shape of detection zone 18. The system is tuned to provide a return through another arc 32. As previously mentioned, false alarm area 26 falls within the arc segment between arcs 30 and 32 and since missed detection area 28 lies beyond the tuned range of the radar system defined by arc 32, objects present there will not be detected. The inherent design compromises presented by the available radar sources and the shape of detection zone 18 are evident from FIG. 2. A designer could reduce the missed detection area 28 by increasing the range of the radar system, for example, to 6.5 meters. This would minimize missed detection area 28 at the expense of increasing false alarm area 26. The range of 6 meters illustrated by arc 32 in FIG. 2 represents a compromise in balancing false alarm area 26 and missed detection area 28. However, the size of these areas may be deemed unacceptable for particular vehicle applications.

Figure 3:
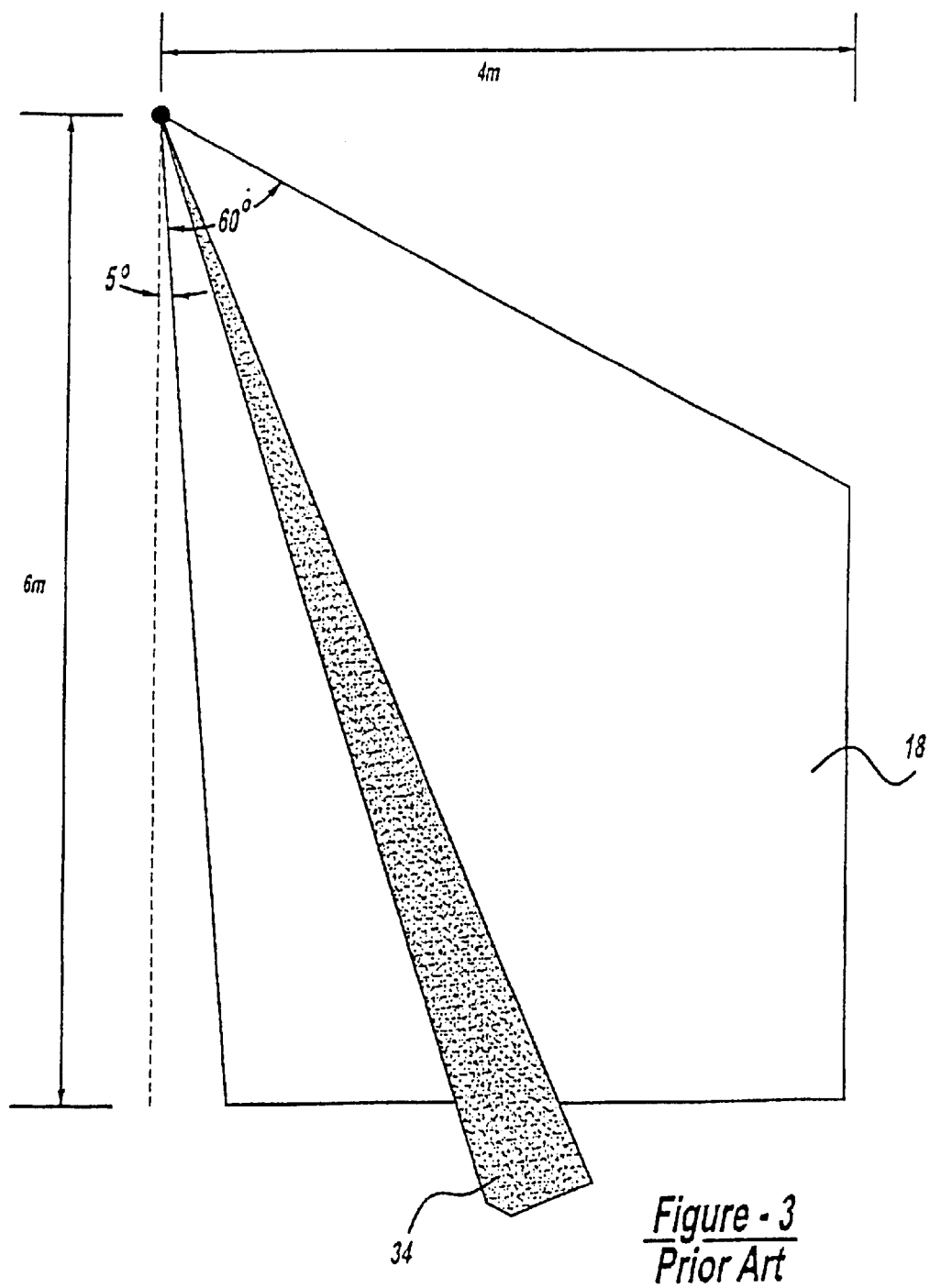
FIG. 3 is a view similar to FIG. 1 showing a prior art approach to locating objects within the detection zone using a sweeping or scanning narrow arc width radar beam.

FIG. 3 illustrates one prior art approach to overcoming the shortcomings of the prior art. As shown in FIG. 3, a narrow radar beam 34 emanates from source 36. Narrow beam 34 has an arc width significantly less than that necessary to encompass detection zone 18. In order to provide coverage throughout detection zone 18, narrow beam 34 is swept between the boundaries of the detection zone. This could be done using electronically shifted phase array sources or by mechanically moving source 36. In either case, an unacceptably large antenna is required for source 36 or unacceptable cost complexity and reliability factors are present.

DETAILED DESCRIPTION OF THE INVENTION

Figure 4:
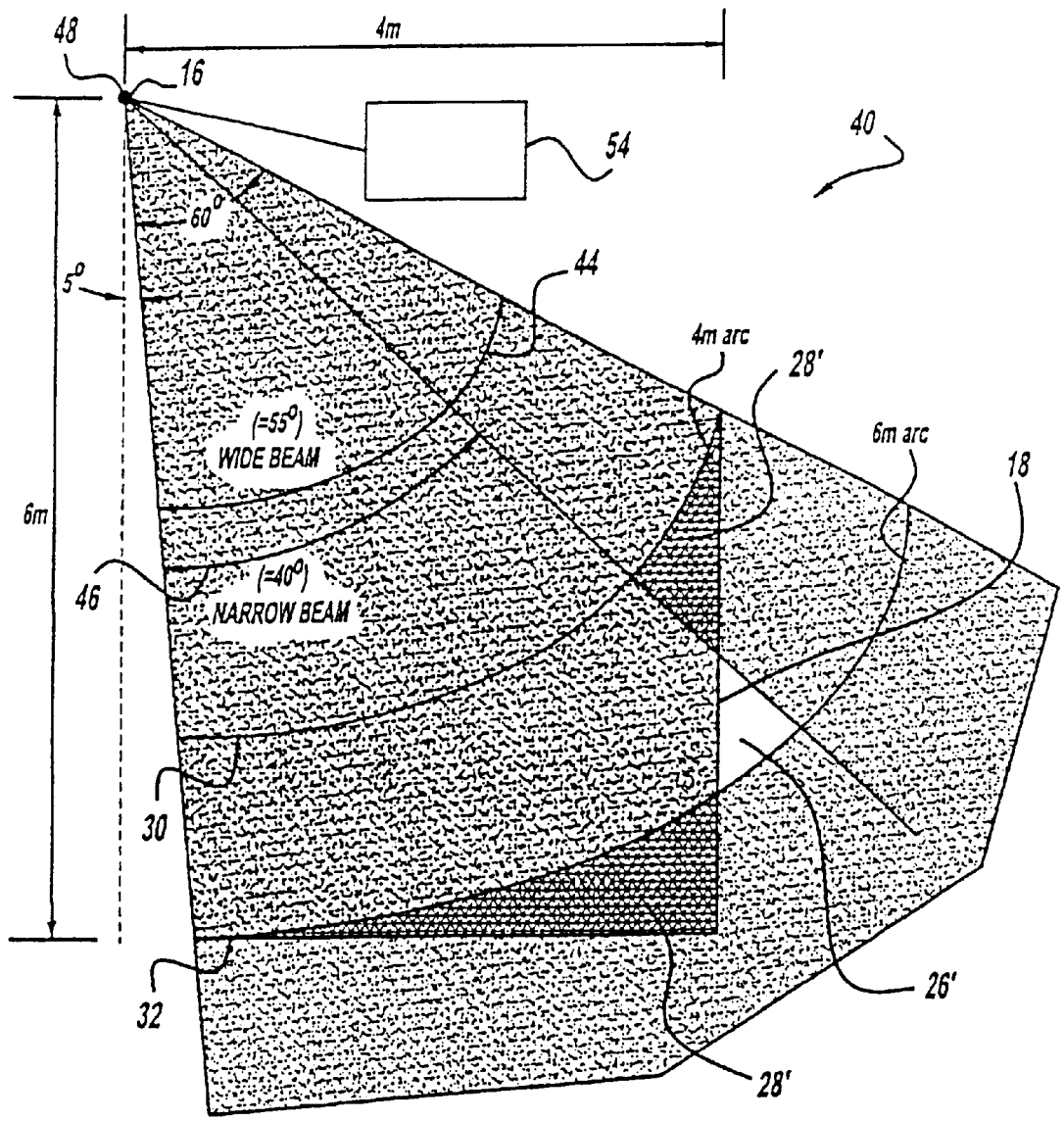
FIG. 4 is a view similar to FIG. 1 showing an overlying pattern of wide and narrow beam radar radiation patterns in accordance with the first embodiment of this invention.

Now with reference to FIG. 4, a first embodiment of a radar field-of-view enhancement method and apparatus is provided designated by reference number 40. This figure also illustrates detection zone 18. In this case, a pair of radar beams are generated including wide beam 44 and narrow beam 46. Beams 44 and 46 may be produced using a single antenna source with multiple feed elements 48 or source 48 could be comprised of multiple discrete antennas inherently producing differing radar radiation patterns. Wide beam 44 has a representative arc width of approximately 55 degrees. Wide beam 44 in fact corresponds precisely with the prior art representative system illustrated in FIG. 2. Narrow beam 46 is shown as having an arc width of approximately 40 degrees. As shown, wide and narrow beams 44 and 46 are measured from the same radial boundary adjacent via the vehicle 10 (not shown in this figure). In this embodiment, both wide and narrow beams 44 and 46 are associated with radar detection systems tuned to provide returns out to 6 meter arc 32.

By using appropriate electronic circuitry, return signals associated with both wide beam 44 and narrow beam 46 can be separated analyzed using a signal processor 54 to produce a significant reduction in false alarms from area 26 prime illustrated in FIG. 4. In operation, wide beam 44 is first presented. In the event that an object is detected using wide beam 44, the relatively large size of false alarms area 26 as shown in FIG. 2 means a detected object present between the 4 and the 6 meter arcs 30 and 32 cannot be positively determined to be within the detection area. In the event of such detection, narrow beam 46 is presented. If the object is not detected using narrow beam 46, it can be concluded that the object was previously in the false alarms area 26. This composite produces a significantly reduced area for false alarms area 26 prime shown in FIG. 4. However, utilizing narrow beam 26 produces a new missed detections area 28 prime. Although this missed detections area 28 prime is provided, it is balanced by a significant reduction in the area of false alarm area 26, shrinking it to the size shown in FIG. 4 as false alarm area 26 prime. As in the case of the prior art, missed detection area 28 remains since both wide beam 44 and narrow beam 46 are tuned to not detect objects beyond 6 meter arc 32.

Figure 5:
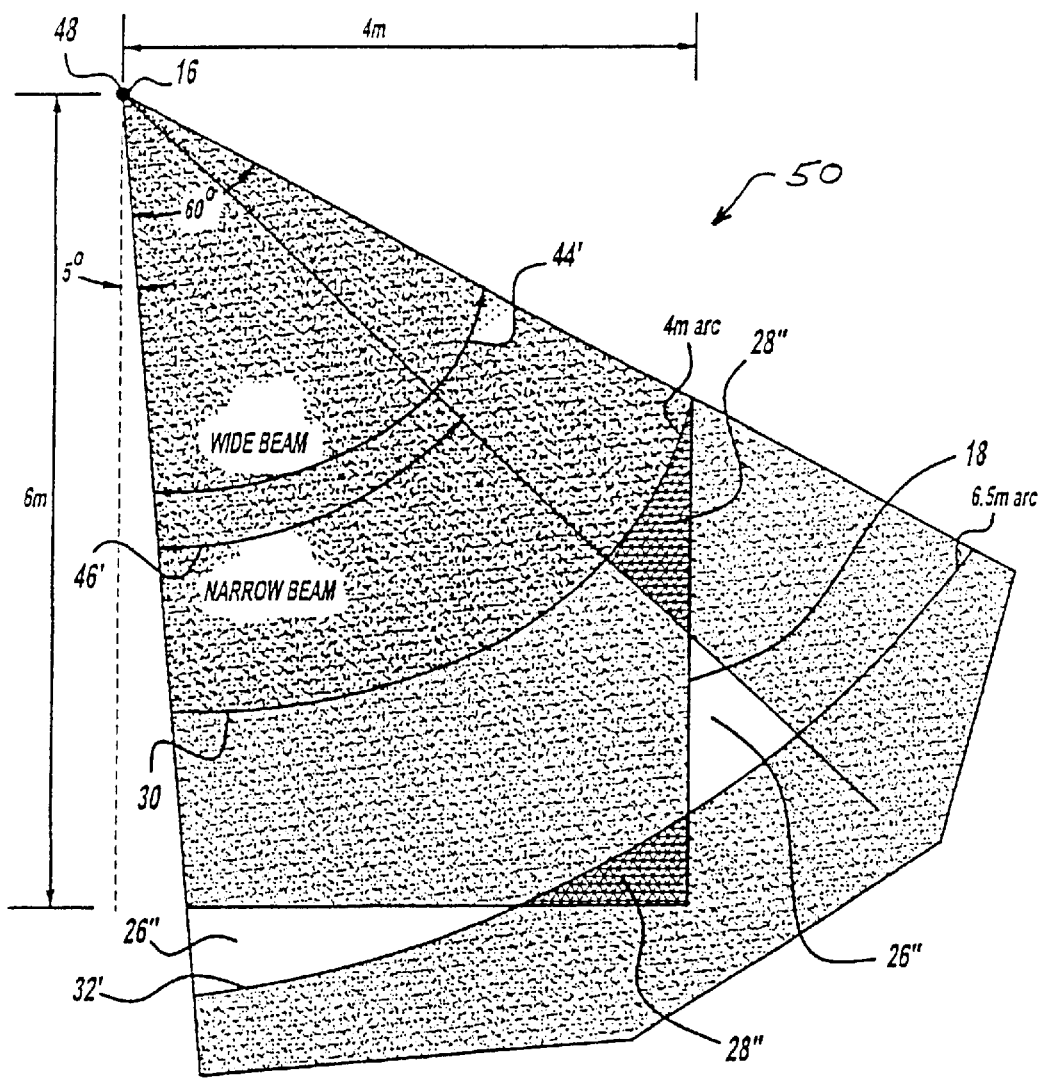
FIG. 5 is a view similar to FIG. 1 showing an overlying pattern of wide and narrow beam radar radiation patterns in accordance with the second embodiment of this invention.

FIG. 5 illustrates a second embodiment of a radar field-of-view enhancement method and apparatus designated by reference number 50. The embodiment shown in FIG. 5 is identical to the design shown in FIG. 4 with the exception that both wide beam 44 prime and narrow beam 46 prime are tuned to measure objects to an arc 32 prime extended to 6.5 meters. In this case, the greater radial distance of arc 32 prime reduces the area of missed detection area 28 to that shown as 28 prime prime. Of course, this reduction is accompanied by an increase in the size of false alarms areas 26 prime prime.

While neither of the embodiments 40 and 50 precisely provide unambiguous positive detection throughout the entirety of detection zone 18 without producing false alarms due to objects outside that zone, they represent a significant improvement in performance over that shown in accordance with the prior art.

Numerous techniques known to the prior art may be implemented in producing wide beam 44 and narrow beam 46. For example, discrete sources having differing antenna configurations may be used which inherently produce these particular pattern characteristics. Associated electronic circuitry could alternately energize these elements. Alternatively, these elements could be operating at different frequencies with a frequency selective receiver employed which can discriminate between the return signals produced by the discrete sources. Another configuration would implement a pair of elements with a discrete phase shifting element interposed between them. The discrete element could be selectively activated and deactivated to produce a discrete "steering" change in the emitted beam pattern. Therefore, this approach would represent a highly simplified version of phased array steerable radar sources. This simplicity would, however, provide cost and simplicity advantages especially suited for applications in automotive vehicles. Another approach is to use a single set of phased shifters to electronically squint (steer) the wide beam 44 such that the outer edge of its illumination pattern is coincident with the narrow beam edge shown in FIG. 4. In such an implementation, the inner edge of the wide beam 44 would be incident on vehicle 10. This, however, should not be a problem since the very shallow incident angle should not produce the significant intensity of return energy signal. Moreover, a consistent return signal from vehicle 10 could be calibrated out by sensor processing.

Another implementation option involves the way in which the wide and narrow beams are alternated. Instead of performing full range sweeps on each beam and "ANDING" their outputs together to discriminate object location, one could sweep out to 4 meters with wide beam 44 active, then sweep from 4 to 6 meters (between arcs 30 and 32) with narrow beam 46 active.

While the above description constitutes the preferred embodiment of the present invention, it will be appreciated that the invention is susceptible to modification, variation and change without departing from the proper scope and fair meaning of the accompanying claims.

We claim:

1. A radar detection system for a vehicle having a desired detection zone spatially associated with said vehicle, comprising:
    a first radar source generating a first radar beam pattern having a first arc beam width with said first beam pattern superimposed upon said detection zone to substantially encompass said detection zone, said first radar source producing a first object detection signal indicating the presence of an object within said first beam pattern, said first beam pattern including a false alarm area outside said detection zone,
    a second radar source generating a second beam pattern having a second arc beam width having an angular measure less than said first arc beam width with said second radar pattern superimposed upon said detection zone to encompass less than the entirety of said detection zone and not encompassing at least a portion of said false alarm area, said second radar source producing a second object detection signal indicating the presence of an object within said second beam pattern, and
    a signal processor for comparing said first object detection signal with said second object detection signal and producing a composite detection signal not affected by objects in at least a portion of said false alarm area.

2. A radar detection system in accordance with claim 1 wherein said vehicle comprises a motor vehicle having an outside rearview mirror with said detection zone being oriented with respect to said mirror.

3. A radar detection system in accordance with claim 1 further comprising:
    said first arc beam width measuring about 55 degrees.

4. A radar detection system in accordance with claim 1 further comprising:
    said second arc beam width measuring about 40 degrees.

5. A radar detection system in accordance with claim 2 further comprising:
    said detection area measuring about 4 meters laterally from said vehicle measured from said mirror and about 6 meters rearwardly from said vehicle measured from said mirror.

6. A radar detection system in accordance with claim 5 further comprising:
    said first beam pattern defining a first region defined by an arc having a radius of about 4 meters from said mirror, and a second arc having a radius of about 6 meters from said mirror, and wherein said false alarm area resides in an area bounded between said first and second regions.

7. A radar detection system in accordance with claim 5 further comprising:
    said second beam pattern defining a first region defined by an arc having a radius of about 4 meters from said mirror, and a second arc having a radius of about 6 meters from said mirror, and wherein said false alarm area resides in an area bounded between said first and second regions.

8. A radar detection system in accordance with claim 5 further comprising:
    said first beam pattern defining a first region defined by an arc having a radius of about 4 meters from said mirror, and a second arc having a radius of about 6.5 meters from said mirror, and wherein said false alarm area resides in an area bounded between said first and second regions.

9. A radar detection system in accordance with claim 5 further comprising:
    said second beam pattern defining a first region defined by an arc having a radius of about 4 meters from said mirror, and a second arc having a radius of about 6.5 meters from said mirror, and wherein said false alarm area resides in an area bounded between said first and second regions.

10. A radar detection system in accordance with claim 1 wherein said first and second beam patterns are each defined by pairs of radial lines and wherein a radial line of each of said beam first and second beam patterns are coincident.

11. A method of detecting the presence of an object present in a desired detection zone spatially associated with a vehicle, comprising:
    generating a first radar beam pattern having a first arc beam width with said first beam pattern superimposed upon said detection zone to substantially encompass said detection zone,
    producing a first object detection signal from said first radar beam pattern indicating the presence of an object within said first beam pattern, said first beam pattern including a false alarm area outside said detection zone,
    generating a second beam pattern having a second arc beam width having an angular measure less than said first arc beam width with said second radar pattern superimposed upon said detection zone to encompass less than the entirety of said detection zone and not encompassing at least a portion of said false alarm area,
    producing a second object detection signal from said second beam pattern indicating the presence of an object within said second beam pattern, and
    comparing said first object detection signal with said second object detection signal and producing a composite detection signal not affected by objects in at least a portion of said false alarm area.

12. A method of detecting the presence of an object in accordance with claim 11 wherein said vehicle comprises a motor vehicle having an outside rearview mirror and orienting said detection zone with respect to said mirror.

13. A method of detecting the presence of an object in accordance with claim 11 wherein said first arc beam width measuring about 55 degrees.

14. A method of detecting the presence of an object in accordance with claim 11 wherein
    said second arc beam width measuring about 40 degrees.

15. A method of detecting the presence of an object in accordance with claim 11 wherein
    said detection area measuring about 4 meters laterally from said vehicle measured from said mirror and about 6 meters rearwardly from said vehicle measured from said mirror.

16. A method of detecting the presence of an object in accordance with claim 15 wherein:
    said first beam pattern defining a first region defined by an arc having a radius of about 4 meters from said mirror, and a second arc having a radius of about 6 meters from said mirror, and wherein said false alarm area resides in an area bounded between said first and second regions.

17. A method of detecting the presence of an object in accordance with claim 15 wherein said second beam pattern defining a first region defined by an arc having a radius of about 4 meters from said mirror, and a second arc having a radius of about 6 meters from said mirror, and wherein said false alarm area resides in an area bounded between said first and second regions.

18. A method of detecting the presence of an object in accordance with claim 15 wherein said first beam pattern defining a first region defined by an arc having a radius of about 4 meters from said mirror, and a second arc having a radius of about 6.5 meters from said mirror, and wherein said false alarm area resides in an area bounded between said first and second regions.

19. A radar detection system in accordance with claim 15 further comprising:

said second beam pattern defining a first region defined by an arc having a radius of about 4 meters from said mirror, and a second arc having a radius of about 6.5 meters from said mirror, and wherein said false alarm area resides in an area bounded between said first and second regions.

20. A method of detecting the presence of an object in accordance with claim 11 wherein said first and second beam patterns are each defined by pairs of radial lines and wherein a radial line of each of said beam first and second beam patterns are coincident.

* * * * *